June 17, 1958    R. D. McCOY ET AL    2,839,244
ELECTRONIC MULTIPLIER AND DIVIDER
Filed June 20, 1952    8 Sheets-Sheet 1
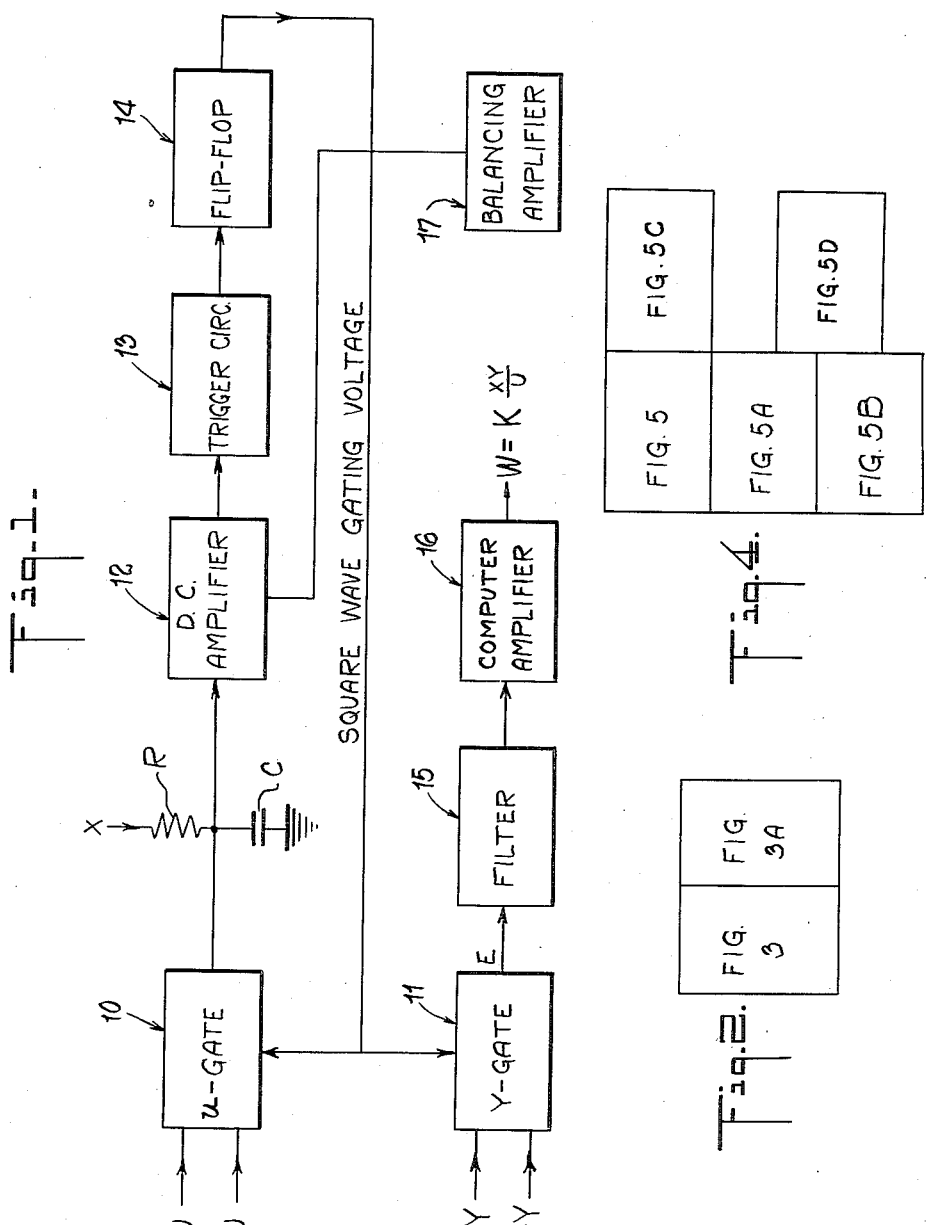
INVENTORS
RAWLEY D. McCOY
LEO WIESNER
BY
Burgess, Ryan & Hicks
ATTORNEYS INVENTORS
RAWLEY D. McCOY
LEO WIESNER
BY
Burgess, Ryan + Hicks
ATTORNEYS

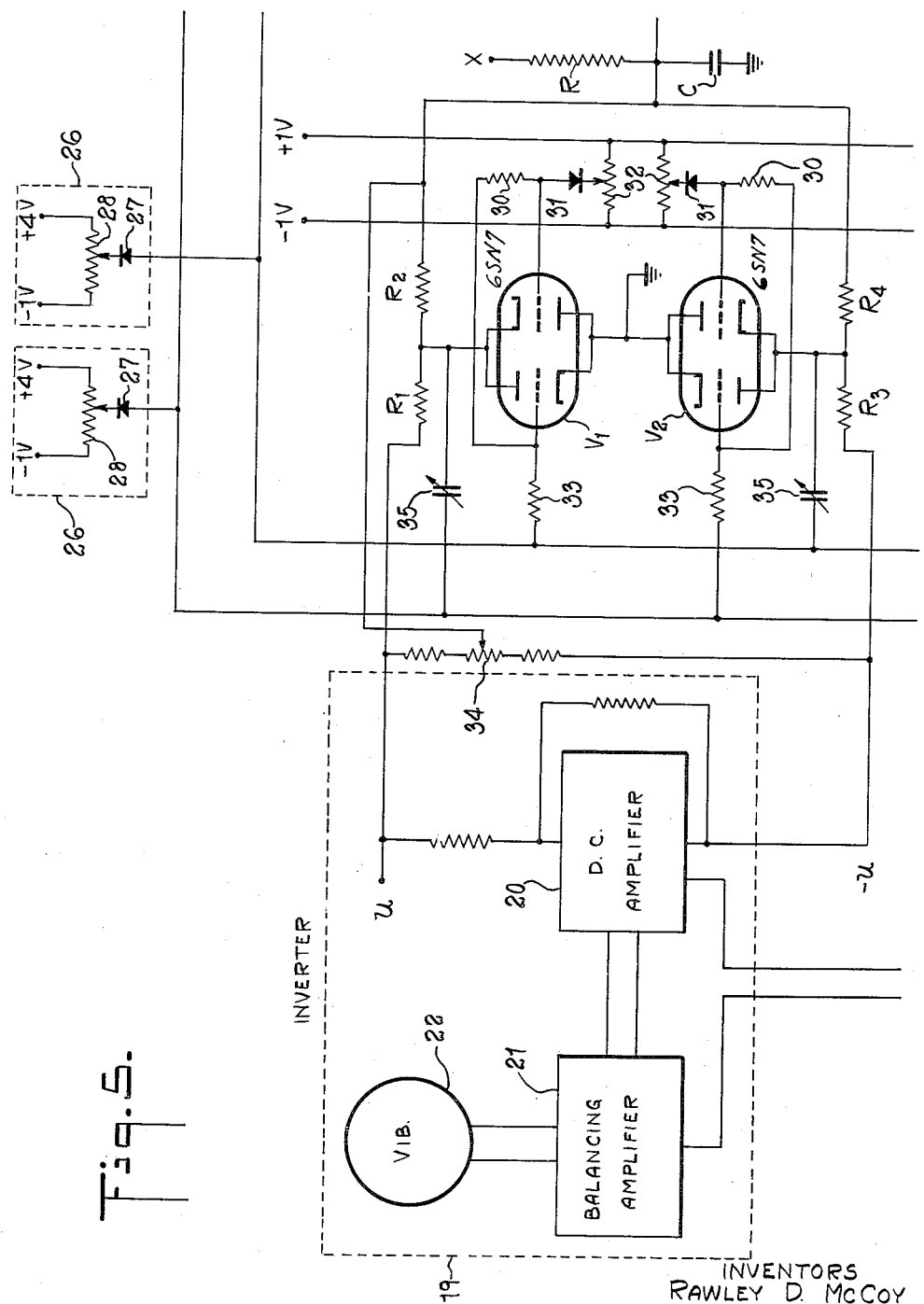

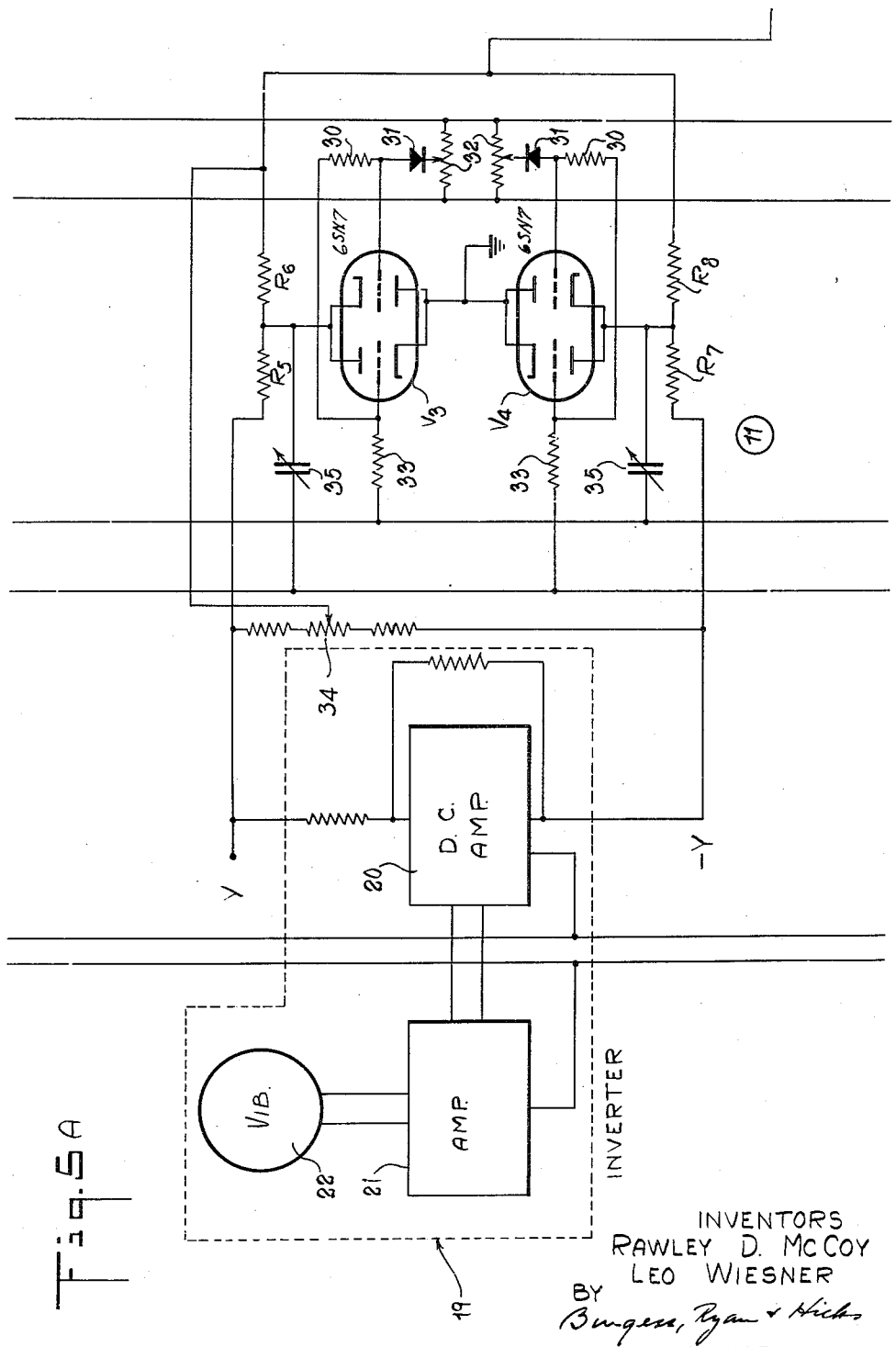

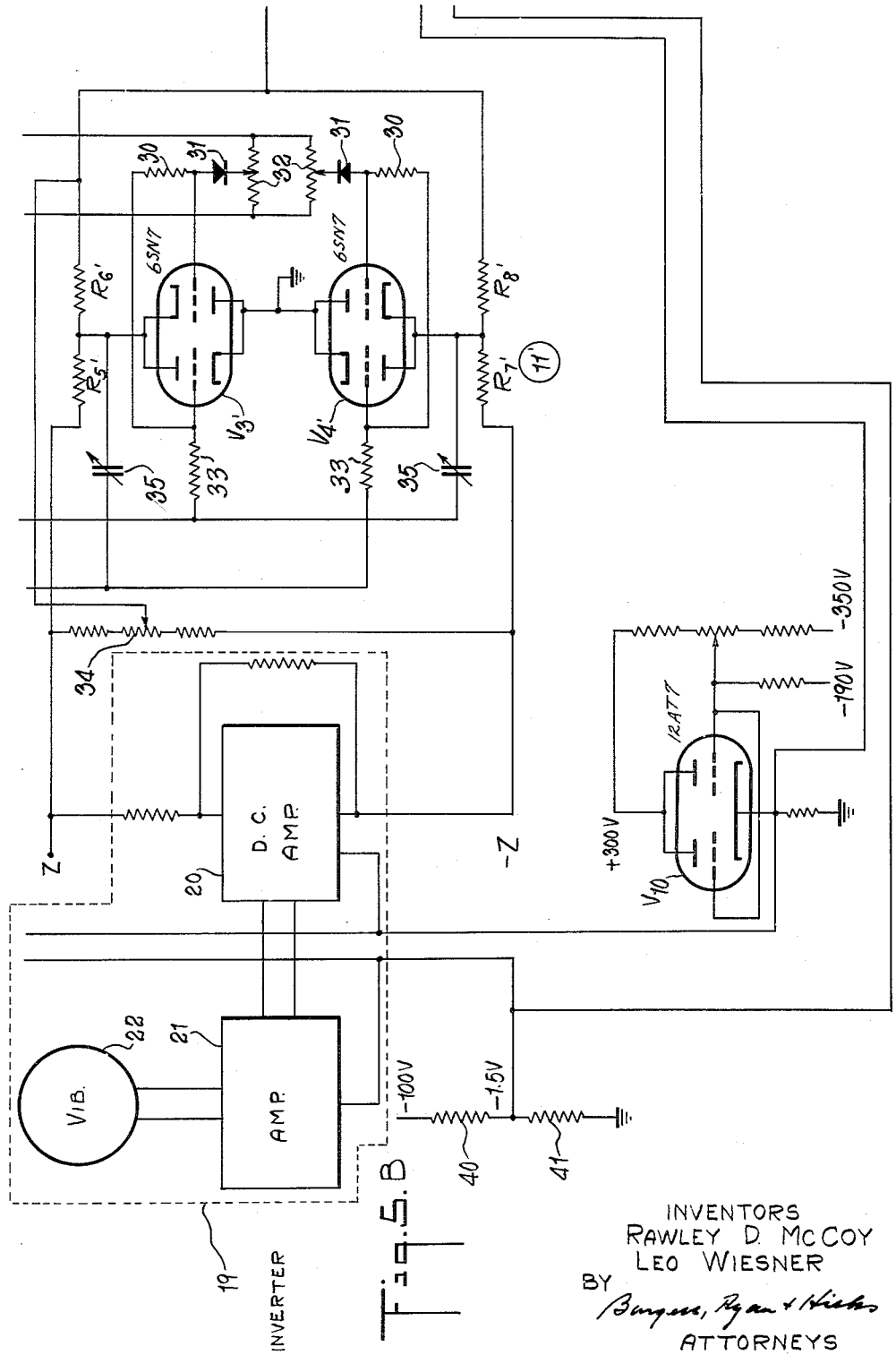

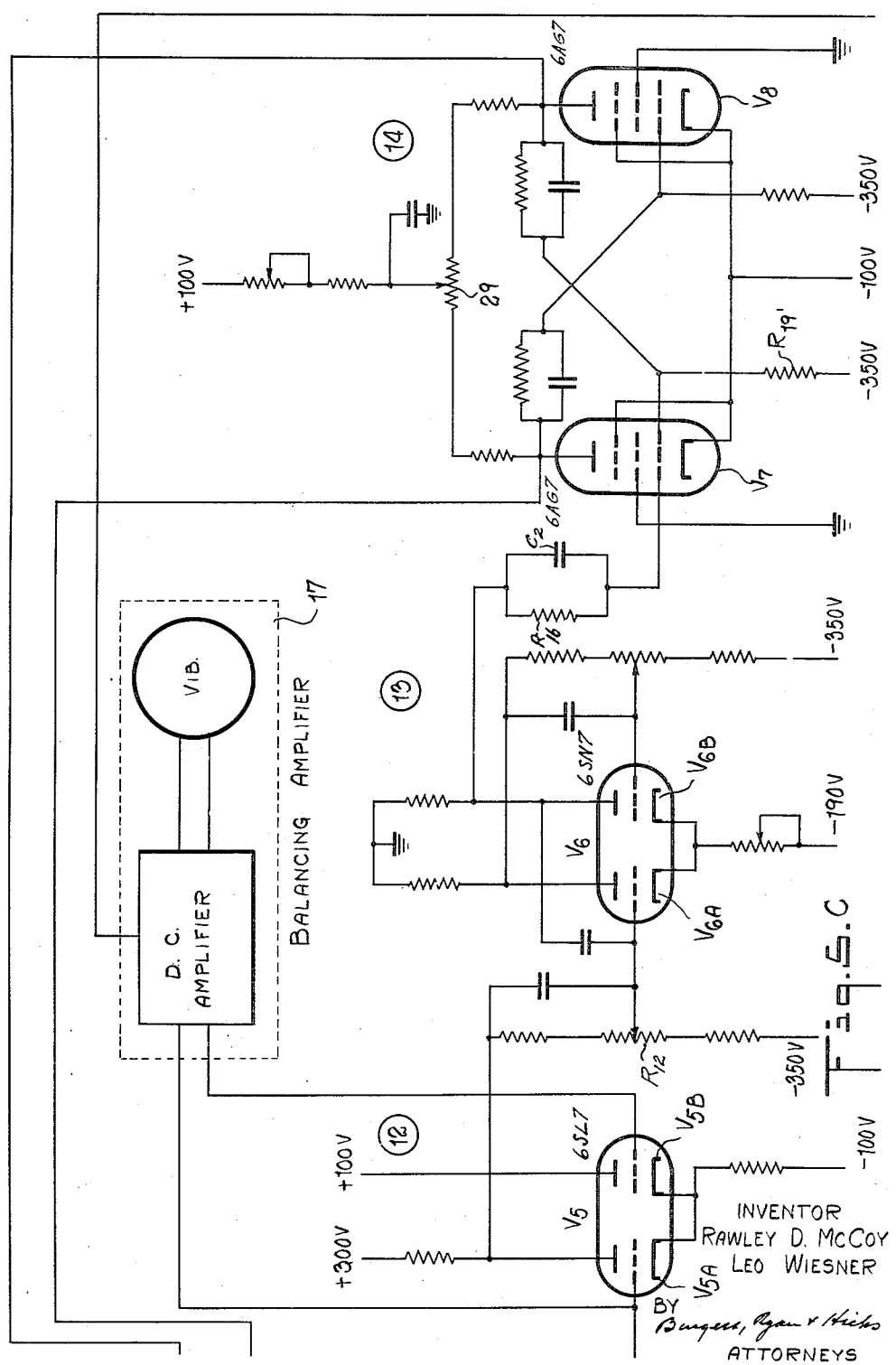

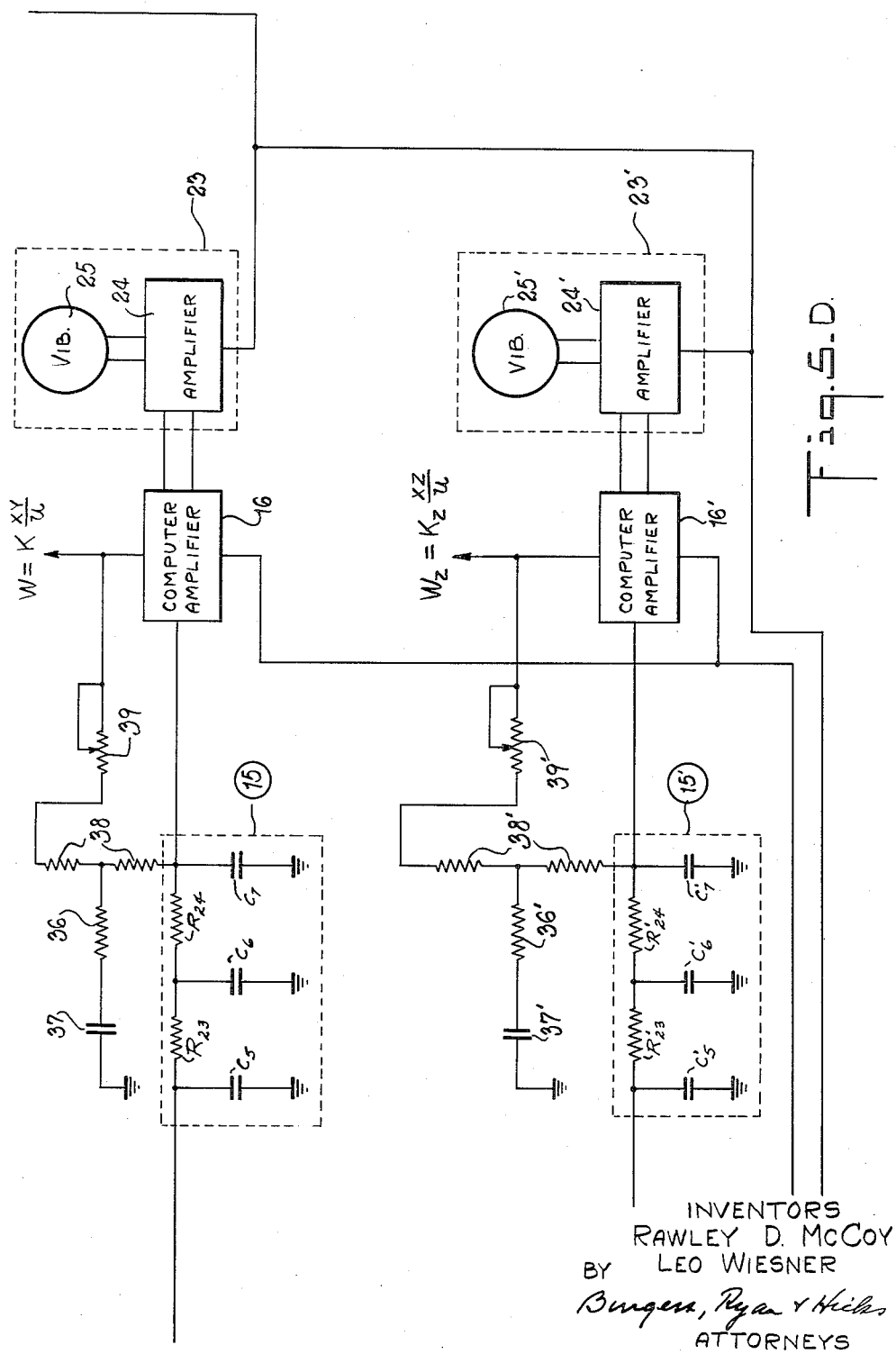

United States Patent Office 2,839,244
Patented June 17, 1958

2,839,244

ELECTRONIC MULTIPLIER AND DIVIDER

Rawley D. McCoy, Bronxville, and Leo Wiesner, Kew Gardens, N. Y., assignors to Reeves Instrument Corporation, New York, N. Y., a corporation of New York Application June 20, 1952, Serial No. 294,752

15 Claims. (Cl. 235—61)

The present invention relates to an electronic multiplier and divider and relates more particularly to an electronic multiplier and divider that is suitable for use in conjunction with an electronic analog computer.

An object of the invention is to provide an electronic multiplier and divider which performs computations involving multiplication and division at higher speeds than are possible by mechanical or electromechanical methods; i. e. by the use of potentiometers that are driven by servomotors or the like. Such mechanical or electromechanical devices are by their nature not capable of a fast response because of the inertia of the moving elements, and some are limited by the accuracy to which the mechanical or electromechanical parts can be made.

The present invention provides a multiplier and divider that is completely electronic and contains no moving parts. It is also much superior in its frequency response to mechanical or electromechanical systems, with which it compares in accuracy, without the need for expensive precision machining.

Other objects and advantages of the present invention will be apparent and best understood from the accompanying drawings in which:

Fig. 1 is a block diagram of an electronic multiplier and divider embodying the present invention;

Fig. 2 illustrates the manner in which the sheets of drawings containing

Figs. 3 and 3A (combined as shown in Fig. 2) illustrate schematically a simplified circuit diagram for an electronic multiplier and divider such as illustrated in Fig. 1;

Fig. 4 illustrates the manner in which the sheets of drawings containing Figs. 5, 5A, 5B, 5C and 5D are to be combined;

Figure 3:
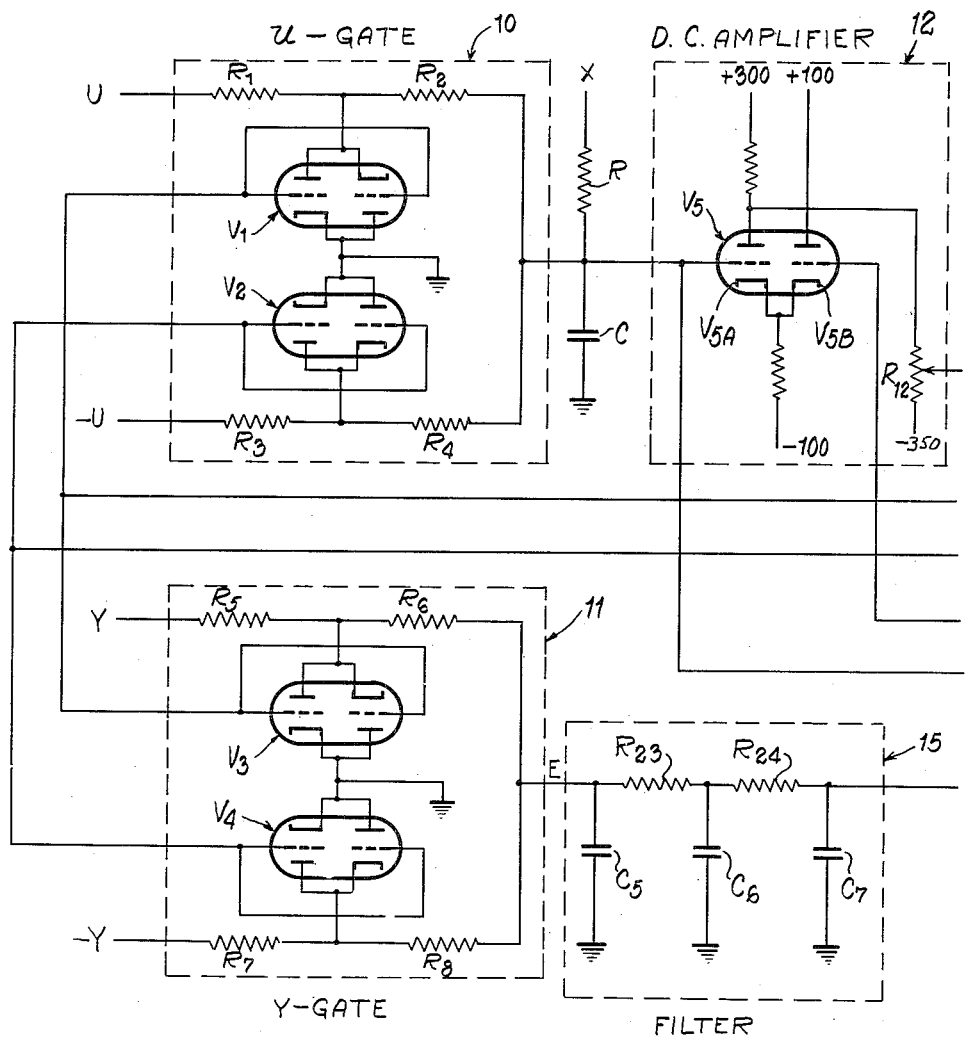
Figs. 3 and 3A are to be combined.
Figure 3A:
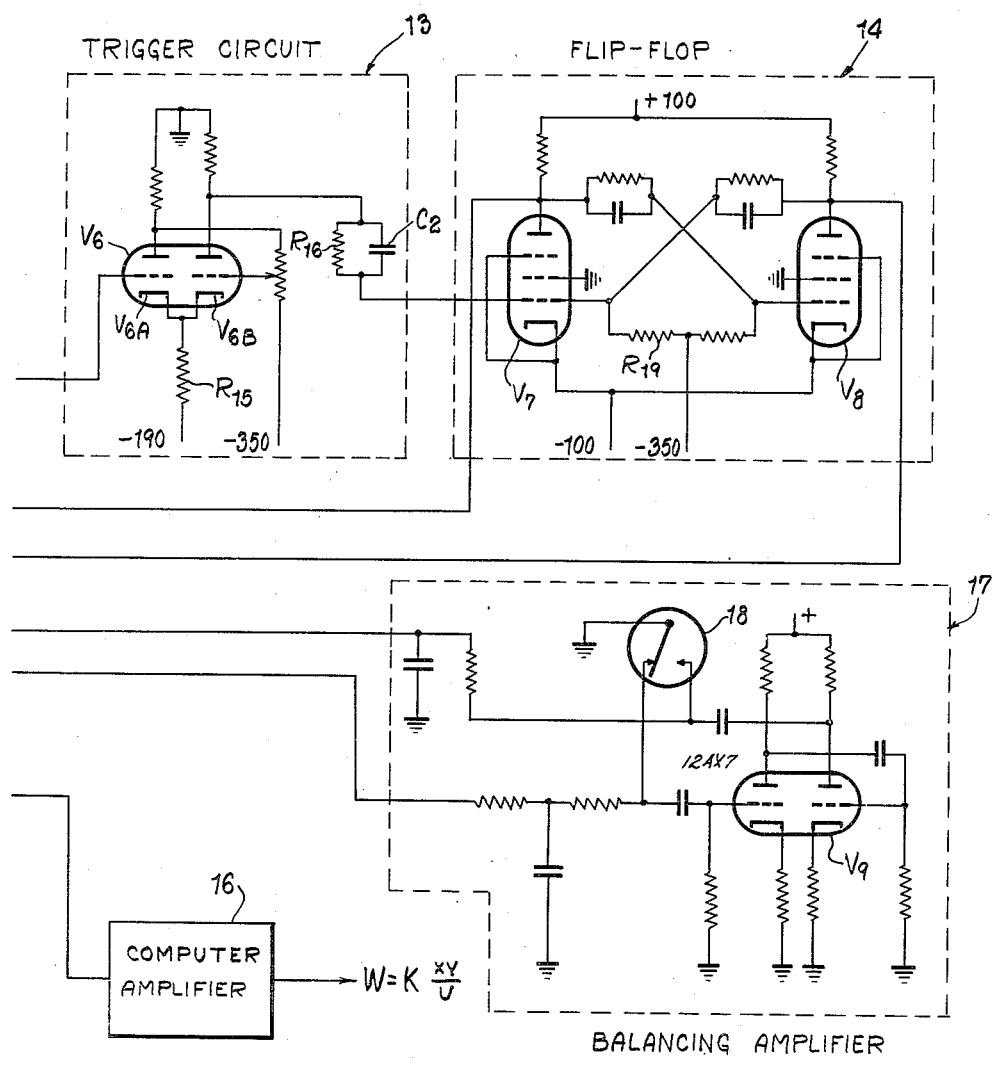

Figs. 5, 5A, 5B, 5C and 5D (when combined as shown in Fig. 4) illustrate schematically a circuit diagram for an electronic multiplier and divider such as illustrated in Figs. 3 and 3A with certain modifications therein.

In the drawings, similar elements have been identified by the same reference characters in the various figures. As shown in Fig. 1, there are a pair of electronic gates 10 and 11 (hereinafter called the U and the Y gates, respectively). Variable input voltages U and —U, which are of equal absolute magnitude and of opposite polarity, are introduced into the U-gate and variable input voltages Y and —Y, which are also of equal absolute magnitude and of opposite polarity, are introduced into the Y-gate.

The operation of the U-gate is controlled so as to produce a square wave output current (or sawtooth voltage) having a frequency of several kilocycles by an electronic circuit which is connected in a regenerative loop with the U-gate. The control circuit consists of a D. C. amplifier 12 which has its input connected to the output of the U-gate 10 and to one side of an integrating capacitor C, the other side of which is grounded. The output of the amplifier is connected to a switching circuit which has two stable states of operation with a sharp transition between its operating states. The switching circuit produces two different output voltages for each of its operating states and the outputs of the switching circuit are respectively connected to control elements in the U and Y gates so as to permit current produced by the input voltages of opposite signs to flow alternately through the gates.

The switching circuit illustrated includes a trigger circuit 13 which has its input connected to the output of the amplifier. The output of the trigger circuit is coupled to a flip-flop circuit 14. The outputs of the flip-flop circuit are in turn connected to the control elements in the gates and thus, control the operation of the U and Y gates.

A third variable input voltage X, which may be either positive or negative, is connected to the output of the U-gate 10 and to the input of the D. C. amplifier 12 through a resistor R.

The output of the Y-gate 11 is in the form of a square wave current having a frequency of several kilocycles and is connected through a filter 15 to a computer amplifier 16. The filter 15 attenuates the square wave output current of the Y-gate and extracts the average D. C. value thereof. The average voltage from filter 15 is then amplified by the computer amplifier 16 to obtain the output of the system.

A balancing amplifier 17 is connected to the D. C. amplifier 12. In the operation of the system, the voltage appearing at the input to the D. C. amplifier is initially adjusted to be substantially zero or to vary between limits lying symmetrically above and below zero potential, and the balancing amplifier is employed to compensate for any drift that may occur in the operation of the D. C. amplifier so as to maintain this condition.

As shown in Fig. 3, the U-gate 10 includes a pair of identical tubes $V_1$ and $V_2$, and dual triodes may be employed for this purpose. In each of the gate tubes, the plate in one half of the tube is connected to the cathode in the other half of the tube; in other words, the two halves of each tube are connected in a back-to-back relation. One set of plate and cathode elements of each of the tubes is connected to ground and the grids in each of the tubes are connected together.

The input voltage U is connected to the ungrounded set of plate and cathode elements of the tube $V_1$ through a load resistor $R_1$ and from there through a summing resistor $R_2$ to the output of the gate. The input voltage —U is connected to the ungrounded set of plate and cathode elements of the other gate tube $V_2$ through a load resistor $R_3$ and from there through a summing resistor $R_4$ to the output of the gate.

Thus, it will be seen that the voltage appearing at the output of the gate will be dependent on the voltage applied to the grids of the tubes $V_1$ and $V_2$. For example, it will be seen that a positive voltage at the grids of the tube $V_1$ will cause both halves of that tube to conduct. If the load resistor $R_1$ is large as compared to the conducting resistance of the tube, the junction of the resistors $R_1$ and $R_2$ will then be substantially at ground potential. Because of the back-to-back connection of the two halves of the tube $V_1$, this is true regardless of the sign of the input voltage U. If the grids of the tube $V_1$ are sufficiently negative, the tube is cut off and does not affect the potential at the junction of the resistors $R_1$ and $R_2$. The gate tube $V_2$ operates in a similar manner with respect to the input voltage —U.

As shown in Fig. 3, the Y-gate 11 is the same as the U-gate 10 and consists of a pair of identical tubes $V_3$ and $V_4$. The input voltage Y is connected to the tube $V_3$ through a load resistor $R_5$ and from there through a summing resistor $R_6$ to the output of the gate, and the input voltage —Y is connected to the tube $V_4$ through a load resistor $R_7$ and from there through a summing resistor $R_8$ to the output of the gate. The Y-gate operates in the same manner as the U-gate and thus, need not be described in detail here.

The input voltage X, which may be positive or negative, is applied to the output of the U-gate 10 through a resistor R, and the voltage which results from the combination of the output of the U-gate 10 with the input voltage X is connected to the input of the D. C. amplifier 12 and also to one side of a capacitor C, the other side of which is grounded. It may be noted here that the input voltages U, X and Y are variable voltages such as may be supplied from an electronic analog computer, and the voltages —U and —Y, which are of the same absolute magnitude as the U and Y voltages, respectively, but of the opposite polarity, may be conveniently obtained by the use of an inverting amplifier of the usual type.

The D. C. amplifier 12, as shown in Fig. 3, consists of a dual triode $V_5$ in which one half $V_{5A}$ serves as an amplification stage, with the other half $V_{5A}$ thereof being cathode coupled thereto to compensate for drift of the amplifier as will be described hereinafter. Thus, the voltage appearing at the ungrounded side of the capacitor C is amplified by the tube $V_5$, and a fraction of the output thereof, as determined by the setting of an adjustable voltage divider $R_{12}$, is applied to a trigger circuit 13.

As shown in Fig. 3A, the trigger circuit 13 is of a well known type which has two stable states of operation, with an abrupt transition between its operating states and two critical input potentials at which such transitions take place. The trigger circuit 13 consists of a dual triode $V_6$, and the output of the D. C. amplifier 12 is connected to the grid of one half $V_{6A}$ thereof. The other half $V_{6B}$ of the tube is coupled to the first half and is controlled by the operation thereof. By suitable choice of the circuit elements involved, a high sensitivity can be achieved so that a small change of potential at the grid of the first half $V_{6A}$ of the amplifier tube $V_6$ will cause transition from a condition where the second half $V_{6B}$ is cut off (plate at ground) to a condition where the second half is conducting heavily (plate negative).

The output of the trigger circuit is connected to the flip-flop circuit 14 through a coupling network which includes a voltage divider consisting of resistors $R_{16}$ and $R_{19}$ and a speed-up condenser $C_2$.

As shown in Fig. 3A, the flip-flop circuit 14 comprises a pair of pentodes $V_7$ and $V_8$ which are coupled together. This circuit operates in a manner similar to the trigger circuit in that it has two stable states of operation with an abrupt transition between them. Thus, either the tube $V_7$ will be conducting and the tube $V_8$ will be cut off, or the reverse condition will exist. While such a flip-flop circuit provides extremely sharp transitions, it requires comparatively large pulses for triggering and for this reason, the trigger circuit 13 is incorporated in the system.

The output of the flip-flop tube $V_7$ is applied to the grids of one of the tubes ($V_1$ and $V_3$) of each of the gates and controls the operation of these tubes. The output of the flip-flop tube $V_8$ is applied to the grids of the other tubes ($V_2$ and $V_4$) of each of the gates and controls the operation of these tubes. The system as described thus far operates as follows:

Assuming that at a particular moment the state of the trigger circuit is such that output half $V_{6B}$ of the trigger tube $V_6$ is cut off (plate at ground potential). The plate of flip-flop tube $V_7$ and, therefore, the grids of the U-gate tube $V_1$ are negative, while the plate of flip-flop tube $V_8$ and the grids of the second U-gate tube $V_2$ are positive. Assume further that there is no charge on capacitor C and that the input voltage X is zero. The second U-gate tube $V_2$ is then conducting and the first U-gate tube $V_1$ is cut off. The capacitor C then charges from the voltage U which is applied thereto through resistors $R_1$ and $R_3$. The voltage —U is not effective, because under the conditions just described, the voltage at the junction of resistors $R_3$ and $R_4$ is held at ground. Thus, when the voltage U applied to the capacitor C is positive, a positive signal increasing with time is applied to the grid of the amplifying stage $V_{5A}$ of the amplifier tube $V_5$ and as a result, a voltage increasing in the negative direction is applied from the amplifier to the grid of the input half $V_{6A}$ of the trigger tube $V_6$. When one of the critical input points of the trigger circuit is reached, the output half $V_{6B}$ of the trigger tube $V_6$ switches from the non-conducting to the conducting state, causing its plate to become negative. In turn, the plate of the flip-flop tube $V_7$ becomes positive and the plate of the flip-flop tube $V_8$ becomes negative. This causes the first U-gate tube $V_1$ to become conducting and the second U-gate tube $V_2$ to become non-conducting.

The voltage across the capacitor C now decreases because the voltage —U is "turned on," while the voltage U is "turned off" and as a result, a positively increasing voltage appears at the grid of the input half $V_{6A}$ of the trigger tube $V_6$. When the second critical input point of the trigger circuit is reached, the output half $V_{6B}$ of the trigger tube $V_6$ is abruptly cut off, making the plate of the flip-flop tube $V_7$ negative and the plate of the flip-flop tube $V_8$ positive. Under the conditions just described, the first U-gate tube $V_1$ again becomes non-conducting, the second U-gate tube $V_2$ becomes conducting, so that the capacitor C charges in positively increasing direction and the cycle repeats.

As a result of this cycle, the gating voltage obtained from the flip-flop circuit and appearing at the grids of the U-gate tubes $V_1$ and $V_2$ is a square wave of equal duration of positive and negative halves. The circuit constants are so adjusted that the frequency of this square wave is several kilocycles. The frequency of the square wave will depend upon the differential between the critical points of the trigger circuit 13, which is governed mainly by the value of the cathode resistor $R_{15}$, and upon the time constant formed by the capacitor C and the resistors $R_1$ and $R_2$ (or $R_3$ and $R_4$). It should be noted here that the calibration of the electronic multiplier is independent of the frequency of the square wave oscillation, which therefore may vary over a wide range.

If a positive voltage X is now applied to the capacitor C through the resistor R, the capacitor C will charge more rapidly in the positive direction and more slowly in the negative direction. The reverse will hold true if the voltage X is negative. The gating voltage obtained from the flip-flop circuit under these conditions will be a modified square wave, the positive and negative portions thereof being of unequal duration.

Because of the sensitivity of the trigger circuit and the gain provided by the amplifier 12, a small change in voltage (less than 0.1 volt) at the grid of the amplifier tube $V_{6A}$ is sufficient to operate the trigger circuit. Furthermore, by suitable adjustment of the voltage divider $R_{12}$ this differential is located at approximately zero potential so that one critical input point of the trigger circuit 13, when referred to the input of the amplifier 12, lies above ground potential by the same amount by which the other critical input point of the trigger circuit, when referred to the input of the amplifier 12, lies below ground potential. This permits the average potential across the capacitor C to remain substantially at zero, which is another way of saying that the time integral of currents flowing into the capacitor, taken over one period of the square wave, is zero. As long as the potential across the capacitor does not change appreciably, the currents during each portion of the square wave may be considered to be constant and the integral becomes the product of current and time. Denoting the duration of the positive portion of the square wave applied to the first U-gate tube $V_1$ as $T_1$, and that of the negative portion as $T_2$, the current-time product may be expressed as:

$$\frac{-U}{R_3+R_4} \cdot T_1 + \frac{X}{R} \cdot T_1 + \frac{U}{R_1+R_2} \cdot T_2 + \frac{X}{R} \cdot T_2 = 0 \quad (1)$$

If $R_1 = R_3$ and $R_2 = R_4$, then $$\frac{T_1 - T_2}{T_1 + T_2} = \frac{R_1 + R_2}{R} \cdot \frac{X}{U} \quad (2)$$

The square wave so generated is also applied to the grids of the Y-gate tubes $V_3$ and $V_4$ which operate on the input voltages Y and $-Y$. Consider the voltage E appearing at the output of the Y-gate (the junction of summing resistors $R_6$ and $R_8$).

During the period $T_1$, when the grid of the first Y-gate tube $V_3$ is positive, this voltage will be:

$$E_1 = \frac{R_6}{R_7 + R_8 + R_6} \cdot (-Y) \quad (3)$$

During the period $T_2$, when the grid of the first Y-gate tube $V_3$ is negative, this voltage will be:

$$E_2 = \frac{R_8}{R_5 + R_6 + R_8} \cdot Y \quad (4)$$

The average voltage will then be:

$$E = \frac{E_1 T_1 + E_2 T_2}{T_1 + T_2} \quad (5)$$

If $R_5 = R_7$ and $R_6 = R_8$, substitution of (3) and (4) into (5) yields:

$$E = -\frac{R_6}{R_5 + 2R_6} \cdot \frac{T_1 - T_2}{T_1 + T_2} \cdot Y \quad (6)$$

Substituting (2) into (6) and collecting all constant factors into a constant $K_1$ yields:

$$E = -K_1 \frac{XY}{U} \quad (7)$$

This average voltage E is extracted by the filter network 15 which is connected to the output of the Y-gate, and is then applied to a computer amplifier 16, which yields an output W which is proportional to the input of the amplifier and may be expressed as:

$$W = -K_2 E = K \frac{XY}{U} \quad (8)$$

where $K_2$ is a constant factor of proportionality and K is a constant which equals $K_1$ times $K_2$.

As shown in Fig. 3, the filter 15 consists of a network which includes resistors $R_{23}$ and $R_{24}$ and capacitors $C_5$, $C_6$ and $C_7$. This filter eliminates the A. C. component of the square wave voltage which has a frequency of several kilocycles and extracts the average voltage. The computer amplifier 16 is of the conventional type and need not be described in detail here.

In the operation of the system, the potential across capacitor C fluctuates between the critical input voltages of the trigger circuit when these voltages are referred back to the grid of the amplifying half $V_{5A}$ of amplifier tube $V_5$. As explained above, these two points are close together and are initially adjusted to lie symmetrically above and below zero potential, but since the system is D. C. coupled throughout, drift may cause a shift of this adjustment. Since the proper operation of the system requires that the average potential across capacitor C remain substantially at ground potential, a balancing amplifier 17 is employed to correct this drift and thus, insure that the proper operating condition exists.

The balancing amplifier 17, as shown in Fig. 3A, consists of a synchronous vibrator or chopper 18 to which the capacitor C is connected and which converts the D. C. potential across the capacitor C into a 60-cycle square wave. The resulting A. C. voltage is amplified by a dual triode $V_9$, the output of which is fed back to the chopper 18 for rectification. After being rectified, the resulting D. C. voltage, which is of a sign opposite to that of the D. C. voltage that caused it, is filtered and is applied to the grid of the second half $V_{5B}$ of the amplifier tube $V_5$, which is cathode coupled to the amplifying half $V_{5A}$ thereof. Thus, if the grid of the amplifying half $V_{5A}$ of the amplifier, which is connected to the capacitor C, drifts for instance from zero in the positive direction, a negative voltage appears at the grid of the other half $V_{5B}$ of the amplifier tube which depresses the common cathode and forces the grid of the amplifying half $V_{5A}$ thereof back to zero.

As shown in Figs. 5 through 5D, provision has been made for the introduction of a fourth variable input voltage Z by the use of another gate 11' hereinafter called the Z-gate, which corresponds to and is connected to other elements of the circuit in the same manner as the Y-gate 11 and thus, need not be described in detail here. The same reference characters with a prime have been applied to the elements of the Z-gate 11' and to the components to which it is connected. The output obtained from the Z-gate is $$W_Z = K_Z \frac{XZ}{U}$$

It will be understood that as many additional gates as required may be added in the same manner to accommodate additional variable input voltages.

As shown in Figs. 5, 5A and 5B, the negative input voltages $-U$, $-Y$ and $-Z$ may be obtained by the use of inverters 19. Each of the inverters 19 consists of a D. C. amplifier 20, the input of which is connected to the input voltage U, Y or Z as the case may be. The amplifier 20 reverses the sign of the input voltage which is then applied to the second gating tube in each instance. Drift of the D. C. amplifier 20 may also be compensated for by means of a balancing amplifier 21 and a vibrator 22 which are connected to the D. C. amplifier in the usual manner. Such a system insures equality of the absolute magnitude between the input and output of the amplifier.

In addition, a balancing amplifier 23 consisting of a D. C. amplifier 24 and a vibrator 25 is connected to each of the D. C. computer amplifiers 16 and 16' to prevent the output amplifiers of the system from drifting.

A voltage limiter 26 is connected to the output of each of the flip-flop tubes $V_7$ and $V_8$. The voltage limiter consists of a crystal diode 27 which is connected through an adjustable resistor divider 28 to potentials of the desired value. This limits the voltage that is applied to the grids of the gate tubes from the flip-flop tubes and insures that the positive grid voltage of the gate tubes will be at the same level. The negative swing of each of the flip-flop tubes $V_7$ and $V_8$ is also equalized by adjustment of a potentiometer 29 which is connected between the plates of these tubes with the arm thereof being connected to a B+ supply.

In addition, when the gate tubes are conducting, any residual voltage caused by contact potential and/or inequality of the tube halves is reduced to zero by means of voltage limiter or clipper circuits which are connected to those grids of each of the gate tubes whose plates are grounded. The voltage limiter or clipper circuits each consist of a dropping resistor 30, crystal diode 31 and an adjustable resistor 32 or voltage divider which is connected across source of voltage of from $-1$ volt to $+1$ volt.

Dropping resistors 33 are also connected between the grids of each of the gate tubes, whose cathodes are grounded, and the flip-flop tubes $V_7$ or $V_8$ to which they are connected. The dropping resistors tend to maintain the positive level of the voltage to which the grids of the gate tubes can swing in the event that a variation in the voltage applied thereto is permitted by the clipper circuits.

An adjustable voltage divider 34, consisting of two fixed wing resistors and a potentiometer, is connected between the positive and negative input of each gate. The arm of the potentiometer is connected to the output of the corresponding gate and is adjusted so as to equalize the operation of each gate for positive and negative input voltages.

Variable trimmer capacitors 35 are connected from the junction point of the load and summing resistors of each gate tube to the square wave gating voltage controlling the opposite gate tube. The capacitors 35 are adjusted to neutralize switching transients which arise at the junction point of the load and summing resistors due to internal capacitances of the gate tubes.

The low-pass filters 15 and 15', shown in Fig. 5D, which are connected, respectively, between the outputs of the Y and Z gates and the corresponding computer amplifiers 16 and 16', attenuate the square wave voltage and extract the D. C. average therefrom as described previously. The phase shift introduced by the filters 15 may be compensated for by a network connected in the feed-back loop of the amplifier. This network may consist of a resistor 36 and a capacitor 37 which are connected between a tap on a feed-back resistor 38 of the computer amplifier and ground.

An adjustable resistor 39 in the feed-back loop of the amplifier permits the amplifier gain to be varied so as to adjust the constant K appearing in Equation 8 to any desired value, specifically unity.

A tube $V_{10}$ (see Fig. 5B) which is connected as a cathode follower, supplies a voltage of approximately 100 volts required for operation of the D. C. amplifiers employed in the system. Resistors 40 and 41 form a voltage divider from which grid bias of —1.5 volts is furnished for the operation of the balancing amplifiers.

It will be understood that in applications where the attenuation of the square wave voltage in the output is not required, the filter 15 may be reduced to one section or entirely eliminated, thereby reducing the phase shift in the output of the system. Also, by increasing the capacitance of the capacitor C, the frequency of the square wave may be reduced. This will result in an increase in the amplitude of the square wave voltage in the output and it will also decrease any residual error due to switching transients in the gates. The capacitance C may also be decreased, resulting in a decreased amplitude of output noise and possibly some small additional error due to switching transients.

In an alternate arrangement of the filter, the feed-back resistor of the output amplifier is connected between the output of the amplifier and the output of the Y- or Z-gate. Filtering of the square wave frequency is accomplished by suitable networks inside the closed loop of the amplifier.

From the foregoing description, it becomes clear that this multiplier-divider has, among others, the following advantages not found in other systems:

(1) It operates for both positive and negative values of both factors to be multiplied, without auxiliary devices.

(2) It is capable of performing, simultaneously, multiplication and division.

(3) It does not require a calibrated reference voltage.

(4) It does not require an externally generated switching frequency.

(5) It is particularly adaptable to the formation of products which have one factor in common. This is done by addition of a gate and amplifier for each variable to be multiplied with the common factor.

(6) It is compensated as to amplifier drift.

It will also be understood that those skilled in the art may make various changes and modifications in the embodiments of the present invention which have been described and illustrated herein without departing from the scope of the invention as defined by the claims appended hereto.

We claim:

1. An electronic computing system comprising in combination a pair of electronic gate circuits, one of said gate circuits being employed to generate an alternating output current, each of said gate circuits consisting of two halves having substantially identical electrical characteristics and being adapted for simultaneously receiving two variable input voltages of opposite polarity and of equal absolute magnitude, each half of said gate circuits including a load resistor, a vacuum tube and a summing resistor, said load resistor being connected between the input voltage applied to said half and an element of said vacuum tube, and said summing resistor being connected between said element and the output of the gate circuit, said vacuum tube including a control element for controlling the flow of current from the load resistor through the summing resistor to the output of the gate circuit, and electronic control means for controlling the operation of the tubes in the gate circuits, said electronic control means being connected in a feedback circuit between the output of the gate generating the alternating output current and the control elements in the gate circuits, said electronic control means having a first output connected to the control element of the tube in one half of each of the gate circuits and a second output connected to the control element of the tube in the other half of each of the gate circuits, said outputs being different and being periodically switched to render one-half of each of the gate circuits conducting and the other half non-conducting.

2. An electronic computing system as defined in claim 1 wherein the frequency of said alternations of the operation of the gate circuits is over a kilocycle per second.

3. An electronic system for multiplying and dividing which comprises a pair of electronic gate circuits, one of said gate circuits being employed to generate an alternating output current, each of said gate circuits consisting of two halves having substantially identical electrical characteristics and having two variable input voltages of opposite polarity and of equal absolute magnitude simultaneously applied thereto, each half of said gate circuits including a load resistor, a vacuum tube and a summing resistor, said load resistor being connected between the input voltage applied to said half and an element in said vacuum tube, and said summing resistor being connected between said element and the output of the gate circuit, said vacuum tube including a control element for controlling the flow of current from the load resistor to the summing resistor and the output of the gate circuit, electronic control means for controlling the operation of the gate circuits, said electronic control means being connected in a feedback circuit between the output of the gate circuit generating the alternating output current and the control elements of the tubes in the gate circuits, said outputs being connected respectively to one of the control elements of each of the tubes in the gate circuits, said outputs being periodically switched for alternately rendering one-half of each of the gate circuits conducting and the other half non-conducting and means for applying another input voltage to said electronic control means.

4. An electronic system for multiplying and dividing which comprises a pair of electronic gate circuits, one of said gate circuits being employed to generate a square wave output current, each of said gate circuits consisting of two halves having substantially identical electrical characteristics and having variable input voltages of opposite polarity and of equal absolute magnitude simultaneously applied thereto, each half of said gate circuits including a load resistor, a vacuum tube and a summing resistor, the load resistor being connected between the input voltage applied to said half and an element in the tube, and the summing resistor being connected between said element and the output of the gate circuit, said tube having a control element therein for controlling the flow of current through the summing resistor to the output of the gate circuit, electronic control means for controlling the operation of the gate circuits, said control means being connected in a feedback circuit between the output of the gate circuit generating the square wave output current and the control elements of the tubes in the gate circuits and having two outputs, said outputs being connected to the control elements of the tubes of the gate circuits and being switched periodically so as to alternately render one-half of each of the gate circuits conducting and the other half non-conducting, means for applying another variable input voltage to said control means, means for extracting the average voltage of the output of the other gate circuit and means for amplifying said average voltage.

5. An electronic computing system comprising in combination a pair of electronic gate circuits, one of said gate circuits being employed to generate a square wave output current, each of said gate circuits consisting of two halves having substantially identical electrical characteristics and having two variable input voltages of opposite polarity and of equal absolute magnitude simultaneously applied thereto, each half of said gate circuits including a load resistor, a control tube and a summing resistor, the load resistor being connected between the input voltage and the control tube and the summing resistor being connected between the control tube and the output of the gate circuit, said control tube having a control element therein and being arranged to control the flow of current from the load resistor through the summing resistor to the output of the gate circuit, electronic control means for controlling the operation of said gate circuits, said control means including an integrating capacitor having one side connected to the output of the gate circuit generating the square wave output current and the other side connected to ground, an amplifier having its input connected to the output of the gate circuit generating the square wave output current and to the ungrounded side of the capacitor, a switching circuit coupled to the output of the amplifier, said switching circuit having two stable states of operation and two outputs, said outputs being different for each of said operating states, one of said outputs being connected to the control element of the tube in one-half of each of the gate circuits and the other of said outputs being connected to the control element of the tube in the other half of each of the gate circuits.

6. An electronic computing system as defined in claim 5 which further comprises means for applying another variable input voltage to the ungrounded side of the capacitor and the input of the amplifier.

7. An electronic computing system as defined in claim 5 wherein said switching circuit includes a flip-flop circuit and a trigger circuit for operating said flip-flop circuit, said trigger circuit being operable by a small voltage differential and furnishing a voltage of large magnitude and steep wave front to the flip-flop circuit.

8. An electronic computing system comprising in combination a pair of electronic gate circuits, one of said gate circuits being employed to generate a square wave output current, each of said gate circuits consisting of two halves having substantially identical electrical characteristics and having two variable input voltages of opposite polarity and of equal absolute magnitude simultaneously applied thereto, each half of the gate circuits including a load resistor, a control tube and a summing resistor, with the load resistor being connected between the input voltage and the control tube and the summing resistor being connected between the control tube and the output of the gate circuit, said control tube having a control element therein for controlling the flow of current from the load resistor through the summing resistor to the output of the gate circuit, an electronically operated control circuit for controlling the operation of the gate circuits, said control circuit including an integrating capacitor having one side connected to the output of the gate circuit generating the square wave output current and the other side connected to ground, an amplifier having its input connected to the output of the gate circuit generating the square wave output current and to the ungrounded side of the capacitor, a switching circuit coupled to the output of the amplifier, said switching circuit having two stable states of operation and two outputs, said outputs being of different voltages for each operating state, one of said outputs being connected to the control element of the tube in one-half of each of the gate circuits and the other of said outputs being connected to the control element of the tube in the other half of each of the gate circuits, filter means connected to the output of the other gate circuit, said filter means extracting the average voltage of the output of said other gate circuit and means for amplifying said average voltage.

9. An electronic computing system as defined in claim 8 further comprising a resistor having one of its terminals coupled to the ungrounded side of said capacitor and being adapted for receiving an applied voltage coupled between the other of its terminal and ground.

10. A high-speed electronic analogue computer system comprising in combination an integrating means adapted to respond to first and second applied input voltages, feedback circuit means coupled to said integrating means, said feedback circuit means including an amplifier, gate generator means, and an electronic gating circuit coupled in cascade, said electronic gating circuit including a pair of triode tubes, said first applied input voltage being coupled to the input of said gating circuit, the output of said gating circuit being coupled to the input of said integrating means, resistor means coupling said second input voltage to the input of said integrating means, said integrating means being responsive to said second input voltage and the output of said gating circuit until the voltage thereacross reaches a first predetermined value thereupon activating said gate generator means, said gate generator means producing two alternating switching voltages coupled respectively to said pair of triode tubes, said switching voltages controlling the conduction of said triode tubes for modifying the current flowing through said integrating means, said integrating means discharging until the voltage thereacross reaches a second predetermnied value thereupon recycling said gate generator means, and means including filter means coupled to the output of said gate generator means, said filter means being responsive to at least one of said alternating switching voltages for extracting the average of said switching voltage and producing an output voltage varying according to the quotient of said first and second applied input voltages.

11. The analogue computer system as defined in claim 10 wherein said means including said filter means coupled to said gate generator means further includes a second electronic gating circuit including a pair of triode tubes, means coupling said two alternating switching voltages respectively to said pair of triode tubes for controlling the conduction of said triode tubes, said second gating circuit being adapted for receiving a third applied input voltage, said filter means being responsive to the average value of the output voltage from said second gating circuit for producing an output voltage varying according to the product of said third applied input voltage and the quotient of said first and second applied input voltages.

12. A high-speed electronic computer comprising in combination an integrating means, an amplifier having an input circuit coupled to said integrating means, a gate generator means coupled to the output of said amplifier, an electronic gating circuit, said electronic gating circuit including a pair of control tubes, means coupling the output of said gate generator means to said pair of control tubes, said gating circuit being adapted for receiving a first applied input voltage, means coupling the output of said gating circuit to said integrating means, resistor means coupling a second applied input voltage to said integrating means, said integrating means being responsive to said second applied input voltage and the output of said gating circuit, said combination forming a closed loop feedback path for automatically controlling the conduction of said control tubes in said gating circuit to maintain the average current flowing through said integrating means substantially zero, said gate generator producing an alternating switching voltage for activating said gating circuit, and means including a filter means coupled to the output of said gate generator means for producing an output voltage varying according to the quotient of said first and second applied input voltages.

13. The electronic computer as defined in claim 12 wherein said means coupling the output of said gate generator means to said pair of control tubes supplies a first alternating switching voltage to one of said control tubes and a second alternating switching voltage of opposite phase to the other of said control tubes.

14. An electronic computer system for dividing an applied numerator voltage by an applied denominator voltage comprising in combination a symmetrical electronic gate circuit including first and second triode tubes and having first and second inputs, means adapted for coupling said denominator voltage to the first input of said gate circuit, means adapted for coupling another voltage equal in magnitude and opposite in polarity to said denominator voltage to the second input of said gate circuit, integrating means coupled to the output of said gate circuit, means adapted for coupling a numerator voltage to said integrating means, said integrating means being responsive to said numerator voltage and the output from said gate circuit, and electronic control means coupled in a feedback relationship between the output of said integrating means and said gate circuit, said electronic control means producing a first alternating output voltage coupled to one of said triode tubes and a second alternating output voltage coupled to said other triode tube, said second alternating output voltage being of opposite phase to said first alternating output voltage, said first and second alternating output voltages controlling the time interval during which said gate circuit couples the two applied voltages to its first and second inputs, respectively to said integrating means for maintaining the average current flowing through said integrating means substantially zero, the average value of one of said alternating output voltages varying according to the quotient of said numerator and denominator voltages.

15. The electronic computer system as defined in claim 14, further comprising a second symmetrical electronic gate circuit including first and second triode tubes and having first and second inputs, means adapted for coupling a multiplier voltage to the first input of said second gate circuit, means adapted for coupling another voltage equal in magnitude and opposite in polarity to said multiplier voltage to the second input of said second gate circuit, means coupling said first alternating output voltage from said electronic control means to one of said triode tubes, means coupling said second alternating output voltage from said electronic control means to the other of said triode tubes, and filter means coupled to the output of said second gate circuit, said filter means being responsive to the average value of the output voltage from said second gate circuit for producing an output voltage varying according to the product of said multiplier voltage and the quotient of said numerator and denominator voltages.

References Cited in the file of this patent

UNITED STATES PATENTS

| | | |
|---|---|---|
| 2,433,667 | Hollingsworth | Dec. 30, 1947 |
| 2,537,427 | Seid | Jan. 9, 1951 |
| 2,538,027 | Mozley | Jan. 16, 1951 |
| 2,558,447 | MacSorley | June 26, 1951 |
| 2,661,153 | Vance | Dec. 1, 1953 |
| 2,672,284 | Dickinson | Mar. 16, 1954 |
| 2,710,348 | Baum | June 7, 1955 |
| 2,773,641 | Baum | Dec. 11, 1956 |

OTHER REFERENCES

National Defense Research Committee, Div. 14, Report 435 (Sack et al.); title page, pages 1–10, Figures 1–8, 1944.

Electronic Instruments (Greenwood et al.), pages 50–53, 1948.